United States Patent

Schlaudroff et al.

[19]

[11] Patent Number: 5,934,797
[45] Date of Patent: Aug. 10, 1999

[54] CLEARANCE/IDENTIFICATION LIGHT MOUNTING BASE FOR LIGHT EMITTING DIODE LIGHTS FOR MOBILE VEHICLE

[75] Inventors: Douglas A. Schlaudroff; John Jacob, both of Fort Wayne, Ind.

[73] Assignee: Navistar International Transportation Corp., Chicago, Ill.

[21] Appl. No.: 08/959,561

[22] Filed: Oct. 28, 1997

[51] Int. Cl.⁶ ...................................................... B60Q 1/26
[52] U.S. Cl. ............................ 362/493; 362/549; 362/800
[58] Field of Search .................................... 362/485, 479, 362/493, 548, 549, 800, 501, 496, 399, 362, 368

[56] References Cited

U.S. PATENT DOCUMENTS

| | | | |
|---|---|---|---|
| 3,656,105 | 4/1972 | Steltzer et al. | 340/119 |
| 3,740,544 | 6/1973 | Newman | 240/8.22 |
| 5,072,340 | 12/1991 | Jones | 362/80 |
| 5,150,959 | 9/1992 | Paffrath et al. | 362/80 |

Primary Examiner—Sandra O'Shea
Assistant Examiner—Ismael Negron
Attorney, Agent, or Firm—Jeffrey P. Calfa; Dennis K. Sullivan

[57] ABSTRACT

A mounting base for a light emitting diode (LED) clearance or identification light for a mobile vehicle such as a truck or a bus. The mounting base is comprised of a centerline structural member with intersecting structural members which are engaged to the centerline structural member at the front end and at two other locations between the front end and the rear end of the centerline structural member. An outer cover encases the centerline structural member and the intersecting structural members. The outer cover extends beyond the front end to form an LED mating surface. The LED mating surface has a slot for an engaging an LED element. The centerline structural member has holes at from the from its top edge to bottom edge at the rear end of the centerline structural member and where the centerline structural member intersects the intersecting structural members. The holes correspond to different vehicle roof mounting configurations. The outer cover has holes corresponding to the holes in the centerline structural member. The entire mounting base is tapered downwards from the LED mating surface backwards.

16 Claims, 2 Drawing Sheets

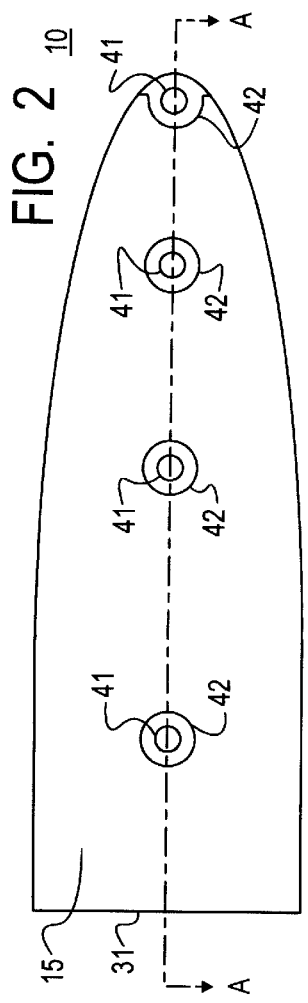
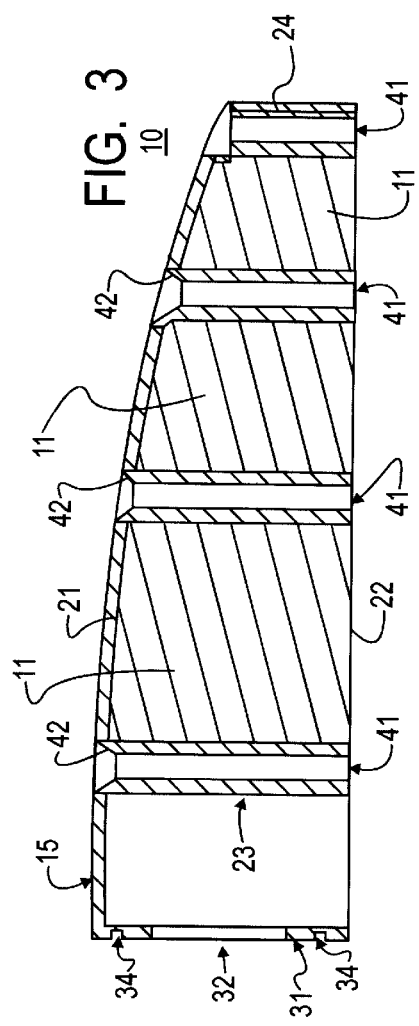
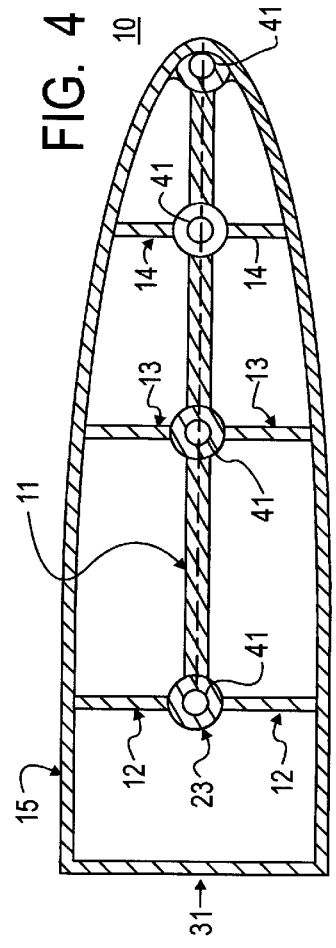
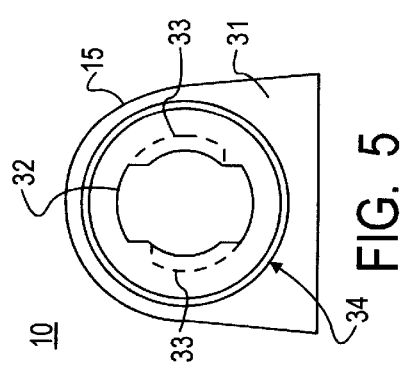

CLEARANCE/IDENTIFICATION LIGHT MOUNTING BASE FOR LIGHT EMITTING DIODE LIGHTS FOR MOBILE VEHICLE

BACKGROUND OF THE INVENTION

The present invention relates to a mounting base for a light emitting diode (LED) clearance or identification light for a mobile vehicle such as a truck or a bus. The mounting base allows for two different mounting configurations on vehicle roofs to conform to vehicle manufacturer needs while still maintaining structural integrity and maximum rear side visibility of the mounting base and LED element.

THE PRIOR ART

LED lights are becoming popular on trucks for exterior lighting due to low current requirements and long life. However, presently vehicles such as trucks or buses require at least two different types of mounting bases with different mounting configurations for roof clearance and identification lighting. This is due to the varying shapes of vehicle roofs even in vehicles made by the same manufacturer. There is no single LED mounting base which may be mounted in multiple configurations on vehicle roofs to serve the purpose of identification and notice of clearance. There is a need for an LED mounting base for the vehicle roof applications of identification and clearance which may be mounted in at least two different configurations and maintain integrity and a long life required to support the long life LED elements while still providing maximum rear side visibility of the LED elements when energized.

SUMMARY OF THE INVENTION

Accordingly, a primary objective of the present invention is to provide the vehicle with an LED mounting base for vehicle roof applications which may be engaged to the roof of a vehicle in at least two configurations while maintaining structural integrity and long life required for long life LED elements. Additionally, it is an objective of the invention to provide a maximum amount of rear side visibility and aerodynamic flow characteristics in these various configurations.

These as well as other objects of the invention are met by the mounting base of the present invention wherein an LED mounting base will have a structural interior defined by multiple cross members. The structural interior is required to provide the support needed for multiple mounting arrangements. The structural interior will be comprised of a centerline structural member through which the mounting holes will pass. The structural interior is further defined by multiple intersecting structural members which are engaged to the centerline structural member in a generally perpendicular fashion at various locations along the centerline structural member. An outer cover encases the structural interior components and extends beyond one end of the centerline structural member to form an LED element mating surface. The LED element mating surface is generally perpendicular to the centerline structural member and has a slot for engaging an LED element. Additionally, the LED element mating surface has a circular seal groove encircling said engaging slot. A circular seal is inserted into the seal groove prior to installation of an LED element. The sealing groove enhances the sealing ability of the seal to improve water resistance of the mounting base. The increased sealing ability is required to support the long life LED element. The outer cover will have mounting holes corresponding to the mounting holes in the centerline structural member. Only two of the holes through the outer cover and centerline structural member will be used at a time for engaging the mounting base to the roof of a vehicle. The unused holes will be filled with hard plastic to provide additionally water tight integrity for the LED element and the vehicle electrical system to which the LED element is functionally connected to.

BRIEF DESCRIPTION OF THE DRAWINGS

Other objects and advantages of the invention will become more apparent upon perusal of the detailed description thereof and upon inspection of the drawings in which:

FIG. 2 is a top view of the clearance light mounting base of FIG. 1.

FIG. 3 is a cut away side view of the clearance light mounting base along line A—A of FIG. 2.

FIG. 4 is a bottom view of the clearance light mounting base of FIG. 1.

FIG. 5 is a front view of the clearance light mounting base of FIG. 1.

DESCRIPTION OF THE PREFERRED EMBODIMENT

Figure 1:
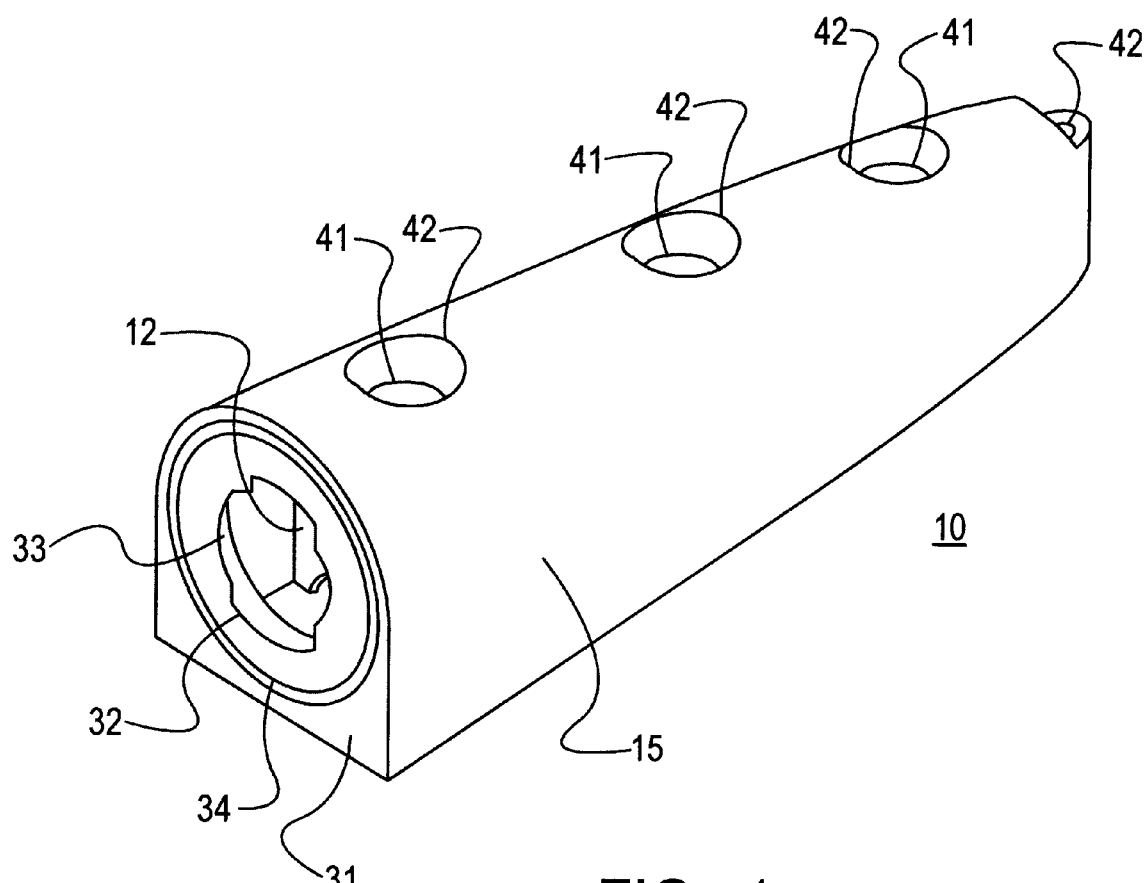
FIG. 1 is a perspective view of an embodiment of the light emitting diode clearance light mounting base for a mobile vehicle of the present invention.

Referring now to the drawings in greater detail, there is illustrated therein a mounting base for a light emitting diode (LED) clearance or identification light for a mobile vehicle such as a truck or a bus made in accordance with the teachings of the present invention and generally identified by the reference numeral 10.

As shown the mounting base 10 is provided for use in a vehicle (not shown) with a roof (not shown) and is comprised generally of five main components as follows: a centerline structural member 11, a first intersecting structural member 12, a second intersecting structural member 13, a third intersecting structural member 14, and an outer cover 15. See FIGS. 1 to 5.

The centerline structural member 11 is a generally flat piece with a top edge 21, a bottom edge 22, a front end 23 and a rear end 24. The first intersecting structural member 12, the second intersecting structural member 13, and the third intersecting structural member 14 each have an upper surface (not shown) and a relatively flat lower surface (not shown), the lower surface 52 corresponding to the contour of the roof of the vehicle. The first intersecting structural member 12 is engaged perpendicularly to the front end 23 of the centerline structural member 11. The second intersecting structural member 13 and third intersecting structural member 14 are engaged perpendicularly to the centerline structural member 11 at locations between the front end 23 and rear end 24 of the centerline structural member 11.

The outer cover 15 encases the upper and side portions of the centerline structural member 11, and the upper surfaces of the first intersecting structural member 12, the second intersecting structural member 13, and the third intersecting structural member 14. The outer cover 15 extends out past the first intersecting structural member 12 and the front end 23 of the centerline structural member 11 to form a light emitting diode (LED) element mating surface 31. The element mating surface 31 is generally perpendicular to the length of the centerline structural member 11. The element mating surface 31 has an engaging slot 32 for engaging an LED element (not shown). The engaging slot 32 contains inner grooves 33 which allow the LED element 103 to be twistably engaged. One type is of LED element that will fit into the engaging slot 32 in the element mating surface is a 2 inch LED light manufactured by Grote Industries, Inc. The element mating surface 31 contains a circular seal groove 34 which encircles the engaging slot 32.

The centerline structural member 11 has four holes 41 running from the top edge 21 to the bottom edge 22. These centerline structural member holes 41 are located at the rear edge 24 and front edge 23 of the centerline structural member 11, and where the second intersecting structural member 13 and the third intersecting structural member 14 engage the centerline structural member 11. The outer cover 15 has mounting holes 42 corresponding to each of the centerline structural member holes 41.

In the preferred embodiment the mounting base 10 narrows from the element mating surface 31 backwards as follows. The centerline structural member 11 is highest where the centerline structural member 11 engages the first intersecting structural member 12 and the height of the centerline structural member 11 gradually decreases towards the rear end 24. The first intersecting structural member 12 is taller and wider than the second intersecting structural member 13 which is taller and wider than the third intersecting structural member 14. The outer cover 15 narrows in height and width from the element mating surface 31 to the rear end 24 of the centerline structural member 11 as the outer cover 15 encases the centerline structural member 11, the first intersecting structural member 12, the second intersecting structural member 13, and the third intersecting structural member 14. This narrowing of the mounting base 10 from the mating surface 31 backwards is important as it provides increased rear side visibility of the LED elements when energized and provides positive aerodynamic flow characteristics across the roof of the vehicle.

One version of the mounting base 10 of this invention corresponds to two different mounting configurations currently used. The hole 41 in the centerline structural member 11 at the second intersecting member 13 engagement location is 2 inches centerline-to-centerline from the hole 41 in the centerline structural member 11 at the third intersecting member engagement location. The hole 41 in the centerline structural member 11 at the first intersecting member 14 engagement location is 6.1 inches centerline-to-centerline from the hole 41 in the rear end 24 of the centerline structural member 11.

The outer cover 15 may be integrated with its encased components into one piece made of a hard plastic. In one version of the invention that hard plastic is injection molded polycarbonate. This durable material further enhances the long life of the mounting base 10.

In another version of the invention, the holes 41 and holes 42 in the outer cover 15 and centerline structural member 11, respectively, at the centerline structural member 11 engagement location with the first intersecting structural member 12 and at the rear end 24 of the centerline structural member 11 are filled in with a hard plastic. A fastener means (not shown) is used to engage the mounting base 10 to the roof of the vehicle through the holes 41 and 42 corresponding to the centerline structural member 11 engagement points with the second intersecting structural member 13 and the third intersecting structural member 14. This is typically done for a mounting location on the roof 102 near the outer forward edge of the roof.

In yet another version of the invention, the holes 41 and 42 in the outer cover 15 and centerline structural member 11, respectively, at the centerline structural member 11 engagement locations with the second intersecting structural member 13 and the third intersecting structural member 14 are filled in with a hard plastic. A fastener means (not shown) is used to engage the mounting base 10 to the roof of the vehicle through the holes 41 and 42 corresponding to the centerline structural member 11 engagement point with the first intersecting structural member 12 and the rear end 24 of the centerline structural member 11.

As described above the mounting base 10 of the present invention provide a number of advantages, some of which have been described above, and others of which are inherent in the invention. Also, modifications may be proposed to the mounting base 10 without departing from the teachings herein. Accordingly, the scope of the invention is only to be limited as necessitated by the accompanying claims.

What is claimed is:

1. A mounting base for a light emitting diode clearance light for a mobile vehicle, comprising:
    (a) a centerline structural member with a top edge, a bottom edge, a front end and a rear end;
    (b) three intersecting structural members, each said intersecting structural member having an upper surface and a relatively flat lower surface;
    (c) a first intersecting structural member of said intersecting structural members being engaged perpendicularly to said front end of said centerline structural member;
    (d) a second intersecting structural member and third intersecting structural member of said intersecting structural members being engaged perpendicularly to said centerline structural member at locations between said front end and said rear end of said centerline structural member;
    (e) an outer cover encasing an upper and side portion of said centerline structural member, and said upper surfaces of said first intersecting structural member, said second intersecting structural member and said third intersecting structural member;
    (f) said outer cover extending out past said first intersecting structural member to form a light emitting diode element mating surface, said element mating surface being generally perpendicular to said centerline structural member;
    (g) said centerline structural member having holes from said top edge to said bottom edge at said rear end and said front end of said centerline structural member, and where said second intersecting structural member and said third intersecting structural member engage said centerline structural member;
    (h) said outer cover having mounting holes corresponding to said centerline structural member holes;
    (i) said element mating surface having an engaging slot for engaging the light emitting diode element; and
    (j) said element mating surface having a circular seal groove encircling said engaging slot.

2. The light emitting diode clearance light mounting base of claim 1, wherein:
    (a) said centerline structural member is highest where said centerline structural member engages said first intersecting structural member and said centerline structural member height is gradually shorter towards said rear end;
    (b) said first intersecting structural member is taller and wider than said second intersecting structural member;
    (c) said second intersecting structural member is taller and wider than said third intersecting structural member; and (d) said outer cover narrows in height and width from said element mating surface to said rear end of said centerline structural member as said outer cover encases said centerline structural member, said first intersecting structural member, said second intersecting structural member and said third intersecting structural member.

3. The light emitting diode clearance light mounting base of claim 2, wherein:
 (a) said centerline structural member hole in said centerline structural member at said second intersecting structural member is 2 inches centerline-to-centerline from said centerline structural member hole at said third intersecting structural member; and
 (b) said centerline structural member hole at said first intersecting structural member is 6.1 inches centerline-to-centerline from said centerline structural member hole in said rear end of said centerline structural member.

4. The light emitting diode clearance light mounting base of claim 3, wherein:
 said outer cover, said centerline structural member, said first intersecting structural member, said second intersecting structural member and said third intersecting structural member are integrated into one piece and are made of a hard plastic.

5. The light emitting diode clearance light mounting base of claim 4, wherein:
 said holes in said centerline structural member at said first intersecting structural member and at said rear end of said centerline structural member are filled in with a hard plastic.

6. The light emitting diode clearance light mounting base of claim 4, wherein:
 said centerline structural member holes in said centerline structural member at said second intersecting structural member and at said third intersecting structural member are filled in with a hard plastic.

7. In combination with a mobile vehicle, a mounting base for a light emitting diode clearance light, comprising:
 (a) a vehicle with a roof, a portion of said roof being relatively flat;
 (b) a centerline structural member with a top edge, a bottom edge, a front end and a rear end;
 (c) three intersecting structural members, each said intersecting structural member having an upper surface and a relatively flat lower surface;
 (d) a first intersecting structural member of said intersecting structural members being engaged perpendicularly to said front end of said centerline structural member;
 (e) a second intersecting structural member and third intersecting structural member of said intersecting structural members being engaged perpendicularly to said centerline structural member at locations between said front end and said rear end of said centerline structural member;
 (f) an outer cover encasing an upper and side portion of said centerline structural member, and said upper surfaces of said first intersecting structural member, said second intersecting structural member and said third intersecting structural member;
 (g) said outer cover extending out past said first intersecting structural member to form a light emitting diode element mating surface, said element mating surface being generally perpendicular to said centerline structural member;
 (h) said centerline structural member having holes from said top edge to said bottom edge at said rear end and said front end of said centerline structural member, and where said second intersecting structural member and said third intersecting structural member engage said centerline structural member;
 (i) said outer cover having mounting holes corresponding to said centerline structural member holes;
 (j) said element mating surface having an engaging slot for engaging the light emitting diode element;
 (k) said element mating surface having a circular seal groove encircling said engaging slot; and
 (l) two fastener means engaging said outer cover, said centerline structural member, said first intersecting structural member, said second intersecting structural member and said third intersecting structural member to said flat portion of said roof through two of said holes in said outer cover and said centerline structural member.

8. The apparatus of claim 7, wherein:
 (a) said centerline structural member is highest where said centerline structural member engages said first intersecting structural member and said centerline structural member height is gradually shorter towards said rear end;
 (b) said first intersecting structural member is taller and wider than said second intersecting structural member;
 (c) said second intersecting structural member is taller and wider than said third intersecting structural member; and
 (d) said outer cover narrows in height and width from said element mating surface to said rear end of said centerline structural member as said outer cover encases said centerline structural member, said first intersecting structural member, said second intersecting structural member and said third intersecting structural member.

9. The apparatus of claim 8, wherein:
 (a) said hole in said centerline structural member at said second intersecting structural member is 2 inches centerline-to-centerline from said hole in said centerline structural member at said third intersecting structural member; and
 (b) said hole in said centerline structural member at said first intersecting structural member is 6.1 inches centerline-to-centerline from said hole in said rear end of said centerline structural member.

10. The apparatus of claim 9, wherein:
 said outer cover, said centerline structural member, said first intersecting structural member, said second intersecting structural member and said third intersecting structural member are integrated into one piece and are made of a hard plastic.

11. The apparatus of claim 9, wherein:
 (a) said holes in said centerline structural member at said first intersecting structural member and at said rear end of said centerline structural member are filled in with a hard plastic; and
 (b) said fastener means more specifically engage said outer cover, said centerline structural member, said first intersecting structural member, said second intersecting structural member and said third intersecting structural member to said roof through said holes in said centerline structural member at said second intersecting structural member and at said third intersecting structural member.

12. The apparatus of claim 9, wherein:
  (a) said holes in said centerline structural member at said second intersecting structural member and at said third intersecting structural member are filled in with a hard plastic; and
  (b) said fastener means more specifically engage said outer cover, said centerline structural member, said first intersecting structural member, said second intersecting structural member and said third intersecting structural member to said flat portion of said roof through said holes in said centerline structural member at said first intersecting structural member and at said rear end of said centerline structural member.

13. The light emitting diode clearance light mounting base of claim 4, wherein:
  said hard plastic is injection molded polycarbonate.

14. The light emitting diode clearance light mounting base of claim 10, wherein:
  said hard plastic is injection molded polycarbonate.

15. The light emitting diode clearance light mounting base of claim 1, wherein:
  said slot in said element engaging surface is more specifically sized to engage a 2 inch light emitting diode.

16. The light emitting diode clearance light mounting base of claim 7, wherein:
  said slot in said element engaging surface is more specifically sized to engage a 2 inch light emitting diode.

* * * * *